United States Patent [19]

Bouchez et al.

[11] Patent Number: 5,899,061
[45] Date of Patent: May 4, 1999

[54] FUEL INJECTION DEVICE FOR A RAMJET OPERATING AT A HIGH MACH NUMBER

[75] Inventors: Marc Bouchez; Emmanuel Saunier, both of Bourges, France

[73] Assignee: Aerospatiale Societe Nationale Industrielle, Paris, France

[21] Appl. No.: 08/879,189

[22] Filed: Jun. 20, 1997

[30] Foreign Application Priority Data

Jun. 24, 1996 [FR] France .................................. 96 07802

[51] Int. Cl.⁶ ............................................. F02K 7/10
[52] U.S. Cl. ............................................. 60/267; 60/270.1
[58] Field of Search .................................. 60/267, 270.1, 60/739, 740, 742

[56] References Cited

U.S. PATENT DOCUMENTS 3,699,773  10/1972  Schuning et al. .
3,727,409  4/1973  Kelly et al. .
4,821,512  4/1989  Guile et al. .............................. 60/270.1
5,220,787  6/1993  Bulman .................................... 60/270.1
5,660,040  8/1997  Henry et al. ............................. 60/270.1
5,727,382  3/1998  Chevalier et al. ....................... 60/270.1

FOREIGN PATENT DOCUMENTS 2 636 677   3/1990   France .

Primary Examiner—Louis J. Casaregola
Attorney, Agent, or Firm—Fisher, Christen & Sabol

[57] ABSTRACT

A fuel injection stub (6) for a ramjet is intended to operate at a high Mach number. According to the invention, the nose of the stub is formed by a thermally conductive thin wall (11) having at least approximately the shape of a dihedron, the angle of said dihedron being at most equal to 15° and the radius of the leading edge (11A) of said nose being at most equal to 2 mm, and said stub includes means (23, 27) for injecting a coolant into the sealed chamber (18), said injection means producing a number of jets of pressurized coolant striking the concave face of said thin wall.

16 Claims, 5 Drawing Sheets

FUEL INJECTION DEVICE FOR A RAMJET OPERATING AT A HIGH MACH NUMBER

BACKGROUND OF THE INVENTION

The present invention relates to a fuel injection device for a ramjet operating at a high Mach number, for example of about 12 to 15.

It is known that ramjets are particularly advantageous for propelling hypersonic aircraft (missiles, airplanes, etc.) since they allow operation over a wide range of Mach numbers, for example from 2 to 15, and they have a low specific fuel consumption. Depending on the application peculiar to an aircraft, and possibly during the flight phase of the latter, the fuel used may be a liquid hydrocarbon, such as kerosene for example, or a gas, such as hydrogen or methane, for example.

It is also known that a ramjet includes, on the one hand, at least one oxidizer inlet, usually consisting of an air duct or an air intake, which directs an oxidizer flow (i.e. air) towards a combustion chamber and, on the other hand, at least one injection device which enables the fuel to be injected into said oxidizer flow so as to obtain a flux of oxidizer/fuel mixture which is ignited in said combustion chamber.

In ramjets designed to operate at a relatively low Mach number (for example up to Mach 2), such a fuel injection device may consist of a number of elementary injectors arranged in the internal wall of the ramjet, on the periphery of the oxidizer flow.

However, for operation at high Mach numbers, when combustion in the ramjet takes place in a supersonic or hypersonic flow, the fuel can no longer be injected just at the internal wall of the ramjet. This is because, in this case, the penetration of the jets of fuel into the oxidizer flow is too low for it to be possible to obtain good mixing of the oxidizer and the fuel within said flow, so combustion is poor or even impossible. Of course, such a drawback becomes more acute the greater the transverse dimensions of the oxidizer flow.

Thus, in order to remedy this situation, injection devices in the form of rails have already been provided, these devices having a number of elementary injectors distributed over their length and arranged in said oxidizer flow, transversely to the latter, while the ends of said rails are fastened to opposite walls of said ramjet. Such an injection device is generally called an "injection stub" and it is used either alone or in combination with fuel injection in the wall.

By using injection stubs, it is thus possible to obtain a satisfactory oxidizer/fuel mixture over the entire cross section of the oxidizer flow. More generally, the injection stubs installed in a hypersonic ramjet make it possible:

- to feed fuel into the entire oxidizer flow, despite the low penetration of the jets of fuel into an oxidizer flow at hypersonic velocities;
- to increase the proportion of fuel in the oxidizer/fuel mixture;
- to assist in the ignition of the oxidizer/fuel mixture and to stabilize the flame; and
- to help compress the oxidizer flow, by reducing the rate of flow of fuel taken up by the ramjet.

Such injection stubs, which are exposed to the action of the oxidizer flow, therefore each behave, from the aerodynamic standpoint, as an airfoil embedded at its ends in two opposite walls of the ramjet. In addition, on that side of their nose which receives the oxidizer flow, said injection stubs must have a leading edge with a small radius for limiting the pressure drops which would restrict the propulsive performance of the ramjet and could even lead to choking of the oxidizer flow, which can remain hypersonic in the combustion chamber only if the velocity of the oxidizer upstream is sufficiently high.

However, the heat-up of said nose produced by the hypersonic oxidizer flow is approximately inversely proportional to the square root of the radius of the leading edge of said nose. Thus, a nose with a small leading-edge radius heats up a great deal. Moreover, it will be noted that, since said injection stubs are arranged inside the ramjet, it is impossible to cool them by radiation with the air through which the aircraft propelled by said ramjet is flying. Such a nose is therefore exposed to very high temperatures: about 5000 K by an aircraft flying at Mach 12 at an altitude of about 30 km. It is therefore necessary to construct the injection stubs from materials such as ceramics, the radius of said leading edge being about 3 to 5 mm. However, in view of the current processes for producing ceramic components, it may readily be imagined that the precision manufacture of ceramic injection stubs, is necessarily lengthy and expensive.

SUMMARY OF THE INVENTION

The object of the present invention is to remedy these drawbacks. It relates to an injection stub, for a hypersonic ramjet, which has a leading edge of small radius and which at the same time can be made of materials other than ceramics.

To this end, according to the invention, the fuel injection stub for a ramjet which is designed to operate at a high Mach number and which includes a combustion chamber into which an oxidizer flow is introduced, said stub including a nose receiving said oxidizer flow and forming a rail of elementary fuel injectors, said rail being arranged in said oxidizer flow transversely to the latter and distributing said fuel in said oxidizer flow, is noteworthy:

- in that said nose is formed, at least near its leading edge, by a thermally conductive thin wall having at least approximately the shape of a dihedron, the angle of said dihedron being at most equal to 15° and the radius of the leading edge of said nose being at most equal to 2 mm; and
- in that said stub includes:
  - a sealed chamber arranged in the concavity of said thin wall of the nose;
  - means for injecting a coolant into said sealed chamber, said injection means producing a number of jets of pressurized coolant which are distributed along said nose and strike the concave face of said thin wall, at least in the region of said leading edge; and
  - means for removing said coolant after impact of said jets against the concave face of said thin wall.

Thus, since said nose is a thin wall whose internal concave face is cooled effectively by the impact of the jets of coolant, the external convex face of said nose, i.e. its leading edge, is also cooled effectively by thermal conduction through the thickness of said thin wall so that the temperature to which said nose is exposed may be only about 1000° C. to 2000° C. (compared with 5000 K mentioned above), although said nose is slender (15° dihedral angle) and has a small leading-edge radius (at most equal to 2 mm). This means that the injection stub according to the present invention may be made of a steel (for example stainless steel), a metal alloy (for example a copper-based alloy) or any other material capable of withstanding the temperature actually attained by said cooled stub, in accordance with the present invention.

In order to achieve this kind of effective cooling of the nose, it has been found that it is advantageous for:

the thickness of said thin wall of the nose to be at most equal to 2 mm;

the constituent material of said thin wall to have a thermal conductivity of 70 W/(m.K); and the coolant to be a low-temperature gas, for example hydrogen at a temperature of 100 K to 300 K.

Of course, it will be understood from the aforesaid that the thickness, thermal conductivity and nature of said thin wall, on the one hand, and the temperature, pressure, flow rate and nature of the coolant, on the other hand, are all parameters enabling the temperature of said thin wall to be adjusted.

For example, a nose wall having a thickness of about 1 mm, the constituent material of which has a conductivity of about 70 W/(m.K), and having a 12° dihedral angle and a 1.5 mm leading-edge radius is raised to a temperature close to 1500° C. for a Mach number equal to 12 if hydrogen is used, as coolant gas, at a temperature of 100 K to 300 K and at a pressure of about 10 to 15 bar with a flow rate of about 2 to 5 g/s for each cm of length of leading edge.

From such a configuration, it is, for example, quite clear that:

if hydrogen is used at a different temperature, it will be possible, all other things being equal, to maintain the wall temperature by modifying said flow rate;

if the constituent material of the thin wall withstands a temperature greater than 1500° C., for example 2000° C., this constituent material may have a thermal conductivity of less than 70 W/(m.K) or the cooling may be less powerful;

etc.

Moreover, it will be noted that the injection stub according to the present invention is not limited to high Mach numbers greater than 10. This is because, if the aircraft is in a flight phase during which the Mach number is less than 10, the coolant may be an ergol, which has a cooling power less than that of hydrogen but which is sufficient to cool the nose at the Mach number in question. All that then remains is to design the coolant feed for the injection stub so that the latter receives an appropriate coolant during each flight phase of the aircraft.

In an advantageous embodiment, the coolant consists of fuel for said ramjet. Thus, it is not necessary to provide, on board the aircraft, a special coolant tank, this coolant being taken off directly from the fuel feed. In addition, after impact of the coolant against the internal concave face of the nose, said evacuation means can recover the coolant and reinject it into the combustion chamber of the ramjet, thus increasing the propulsive performance of the ramjet.

Recovery of the coolant can take place either inside or outside said injection stub and the recovered coolant can be injected into the combustion chamber either directly or through the elementary fuel injectors of said stub. Optionally, between its recovery and its reinjection into the combustion chamber, said coolant may be used to cool an element of said ramjet, for example the shroud of an air intake.

Of course, for good recovery of the coolant it is necessary to take into account the pressure differences between the injected fuel and the recovered fuel, the latter being expanded and at a low pressure. It is necessary to ensure that the high-pressure fuel flows into the low-pressure recovered fuel. Optionally, a supercharger may be provided in the recovered-fuel circuit in order to increase the pressure.

Preferably, the flow rate of fuel used as coolant is less than 20% of the total flow rate of fuel injected into the combustion chamber of the ramjet.

The injection stub according to the present invention could be made as a single piece. However, it is advantageous to make it in at least two pieces which are joined together, in order to make it easier to produce said sealed chamber, the channels feeding the elementary fuel injectors, the channels feeding the coolant injection means, the channels for removing the coolant after impact, etc.

Moreover, it will be noted that that part of said stub which is downstream (with regard to the direction of flow of the oxidizer flow) is subjected to thermal stresses which, although high, are less than those to which said nose is subjected.

Thus, in an advantageous two-component embodiment, the injection stub according to the present invention is noteworthy:

in that it includes:

a body in which said rail of elementary fuel injectors, said coolant injection means and said means for removing said coolant are arranged; and a nose piece having at least approximately the shape of a dihedron with thin faces constituting said thin wall;

in that said nose piece is joined to said body, in a sealed manner, by said thin faces; and in that, in the position in which said nose piece is joined to said body, said sealed chamber is formed in the concavity of said nose piece, between the latter and said body.

Said body and said nose piece may be joined together by any means appropriate to their constituent materials, for example by welding or brazing, or alternatively by means of screws, adhesive, etc.

Preferably, at least on the side where said nose is located, said body has a cross section with the shape of a wedge, the angle of which is equal to that of said nose piece, so that said thin faces of the nose piece are pressed against the faces of said wedge and in which the edge of said wedge is cut over at least part of its length in order to form at least one end facet in which injection nozzles are arranged, said injection nozzles forming part of said coolant injection means and producing said jets of said coolant striking the concave face of said thin wall.

Said means for removing the coolant may include:

at least one longitudinal groove made on the surface of said body and closed off by one face of said nose piece; and an array of transverse surface grooves bringing said sealed chamber into communication with said longitudinal groove and also closed off by said nose piece.

Likewise, said fuel injection rail and said coolant injection means may include longitudinal feed channels and transverse injection channels, all these being made in said body of the stub.

In order better to inject the fuel into the oxidizer flow, it is advantageous for said fuel injection rail to be arranged on that side of the stub which is opposite the nose. Moreover, in order further to improve the injection of fuel into the oxidizer and the fuel/oxidizer mixture, the fuel injection rail may include series of separate elementary injectors, some of them injecting fuel in the direction of the oxidizer flow and the others injecting fuel obliquely into said flow.

In this case, the body of the injection stub may include, on the side opposite said nose, a projecting central longitudinal base rib, at least one series of elementary injectors being arranged in said base rib and injecting fuel in the direction of the oxidizer flow, while at least two series of elementary injectors injecting fuel obliquely into said flow are arranged on each side of said base rib.

Moreover, in the usual manner, the body of the injection stub includes, at its ends, heads which are designed to anchor the stub in opposite walls of the ramjet and to feed said stub with fuel and coolant.

In this case, it is advantageous for said nose pieces to at least partly cover said heads so that this piece is held in place by being anchored in said walls of the ramjet. Thus, the nose piece and said body are more securely fastened together.

BRIEF DESCRIPTION OF THE DRAWINGS

The figures of the appended drawing will make it clear how the invention can be realized. In these figures, identical references denote similar elements.

Figure 1:
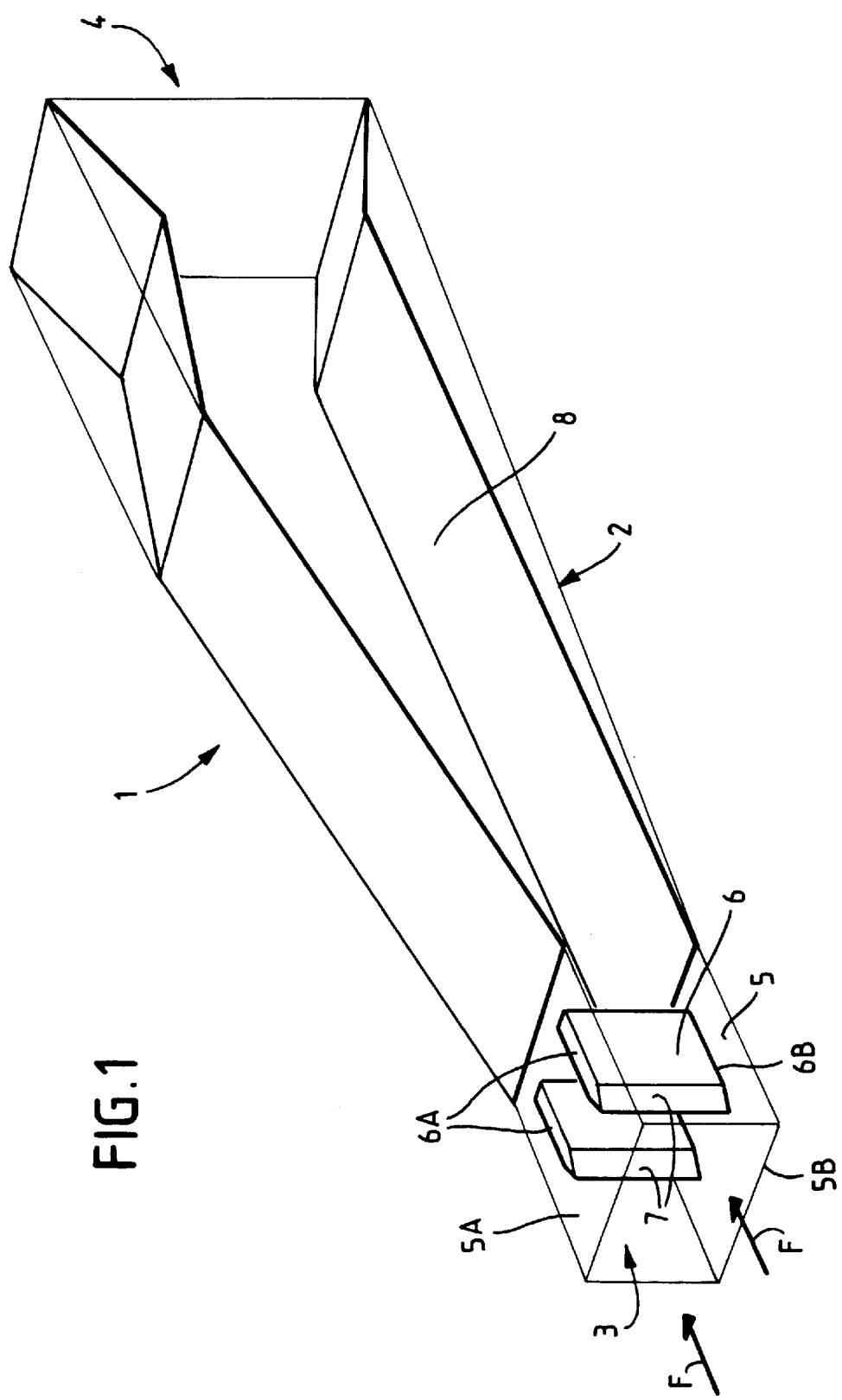
FIG. 1 is a highly diagrammatic perspective view of an illustrative embodiment of a ramjet provided with fuel injection stubs, it being assumed that the casing of said ramjet is transparent.
Figure 2:
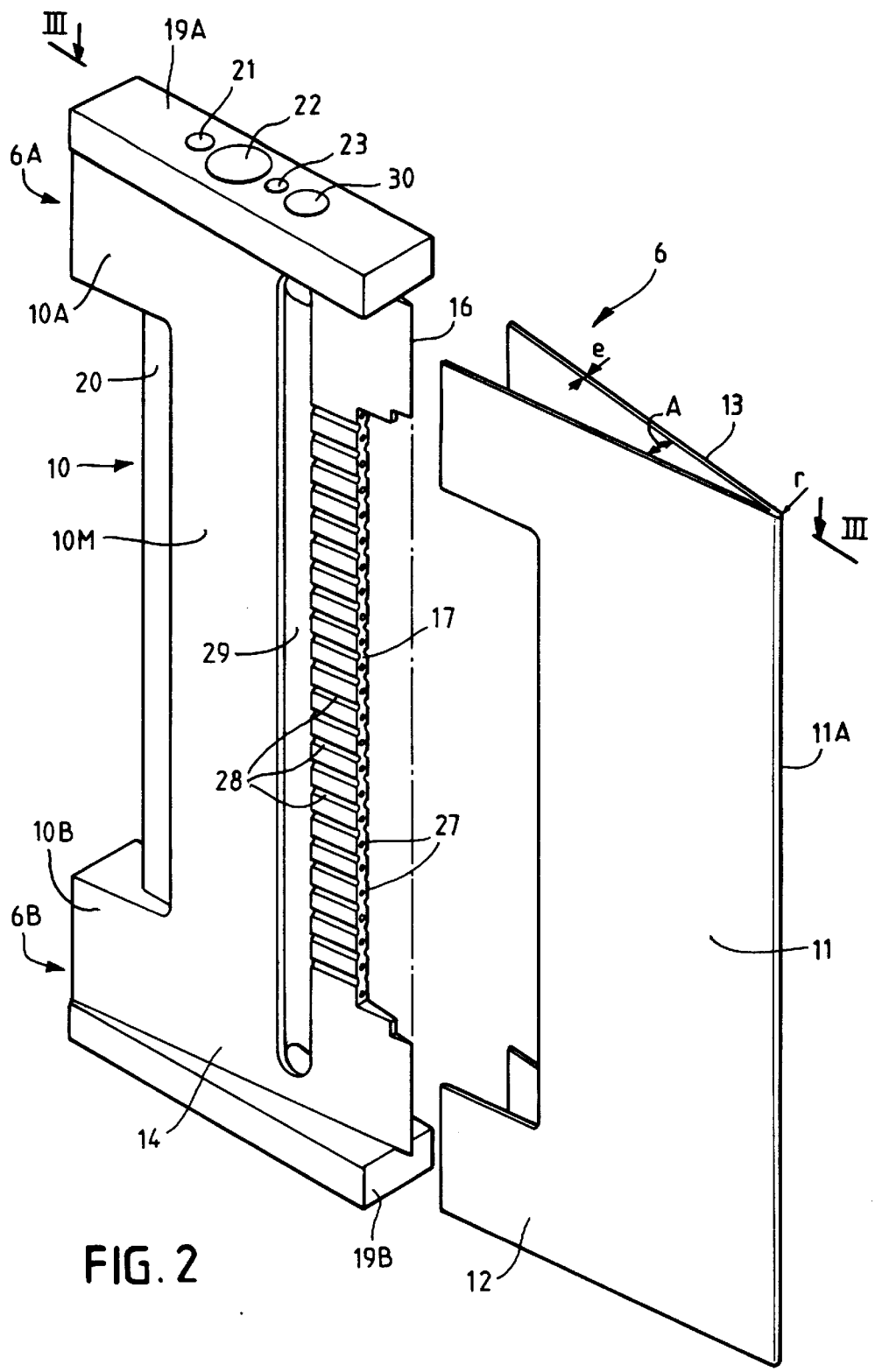
FIG. 2 is an exploded perspective view of an illustrative embodiment of the fuel injection stub according to the present invention.

The ramjet 1, shown in FIG. 1, is intended for propelling a hypersonic aircraft (not shown) which has to fly over a wide Mach number range, for example from about Mach 6 to a Mach number of about 12 to 15.

DETAILED DESCRIPTION OF THE INVENTION

The ramjet 1 includes a casing 2 provided, at one of its ends, with an air intake 3 for an airflow (shown symbolically by arrows F) which has to be used as the oxidizer and, at its opposite end, with a nozzle 4. Downstream of the air intake 3, the casing 2 forms an injection chamber 5 in which two fuel injection stubs 6 are arranged transversely to the oxidizer flow F. The injection stubs 6 include a nose 7, which receives said oxidizer flow, and are fastened to the casing 2, via their ends 6A and 6B fixed to the internal face of two opposite walls 5A and 5B of the injection chamber 5. Between the injection chamber 5 and the nozzle 4, the casing 2 delimits a combustion chamber 8, in the upstream part of which are provided igniters (not shown). In their rear part (that is to say facing the combustion chamber 8), said injection stubs 6 include longitudinal injection rails (not visible in FIG. 1 but shown in FIGS. 3, 4 and 6).

Thus, the fuel is distributed over the entire oxidizer flow F, at the injection stubs 6, and the combustion of the flux of oxidizer/fuel mixture takes place in the combustion chamber 8, after which the combustion gases are expelled through the nozzle 4. It will be noted that, in the case of the lowest flight Mach numbers (up to Mach 8), it is possible to use kerosene as the fuel (optionally with hydrogen sparging so as to facilitate ignition of the ramjet and pluming of the jet) and, in the case of higher Mach numbers, it is then possible to use hydrogen as the fuel. Other fuels, such as methane, endothermic hydrocarbons and synthetic fuels, may also be employed for a ramjet of this type.

In the particular illustrative embodiment shown in FIG. 1, the casing 2 of the ramjet has, in its entirety, a shape of a duct of rectangular or square cross section, generally consisting of four walls, pairs of which are opposite each other (the walls are assumed to be transparent in this FIG. 1). It should be clearly understood that such a configuration is in no way limiting.

As mentioned above, the leading edge of the nose 7 of the injection stubs 6 is exposed to very high heat fluxes when the oxidizer flow corresponds to hypersonic flight. At Mach 12, the nose 7 is raised to a temperature of about 5000 K.

FIGS. 2 to 7 illustrate an embodiment for an injection stub 6 according to the invention and capable of withstanding such high thermal stresses.

As shown in these figures, in this embodiment the fuel injection stub 6 includes a body 10, for example a one-piece metal body, in which, as will be seen later, fuel injectors, coolant injection means and means for removing this coolant are arranged. In addition, this stub 6 includes a nose piece 11, for example one made of metal or at the very least made of a material whose thermal conductivity is about 70 W/(m.K), having the shape of a dihedron whose angle A is at most equal to 15°, for example equal to 12°. In addition, the thickness e of the faces of the nose piece 11 is at most equal to 2 mm, for example equal to 1.5 mm, and the radius r of the edge 11A of the piece 11 is at most equal to 2 mm. The piece 11 is intended to form the nose 7 of the stub 6, its edge 11A then being the leading edge of said nose.

Over its greater length, the body 10 has a wedge-shaped cross section, the angle of the wedge being equal to the angle A of the nose piece 11.

Thus, as shown in FIGS. 3 to 7, the faces 12 and 13 of the nose piece 11 are applied against the faces 14 and 15 of the body 10 when the two pieces 10 and 11 are joined together in a sealed manner, for example by means of welding or of screws (in a manner not shown).

The edge 16 of the wedge of the body 10 is indented and cut in the central part 10M of said body in order to form an end facet 17. Thus, when the pieces 10 and 11 are joined together, a sealed chamber 18 is delimited, in the concavity of the nose piece 11, between the internal surface of the faces 12 and 13 and the facet 17 of the body 10.

The ends 6A and 6B of the stub 6, which are intended to be anchored in the two opposite walls 5A and 5B of the injection chamber 5, correspond to widened parts 10A and 10B, on the opposite side from the edge 16, of the triangular central part 10M of the stub, said enlarged parts also being covered by the faces 12 and 13 of the nose piece 11, as well as to parallelepipedal end heads 19A and 19B, respectively supported by said enlarged parts 10A and 10B.

The central part 10M of the body 10 includes, on the opposite side from the facet 17, a longitudinal base rib 20 which projects from and is joined to the heads 6A and 6B.

The body 10 is drilled longitudinally by channels 21, 22 and 23.

Figure 3:
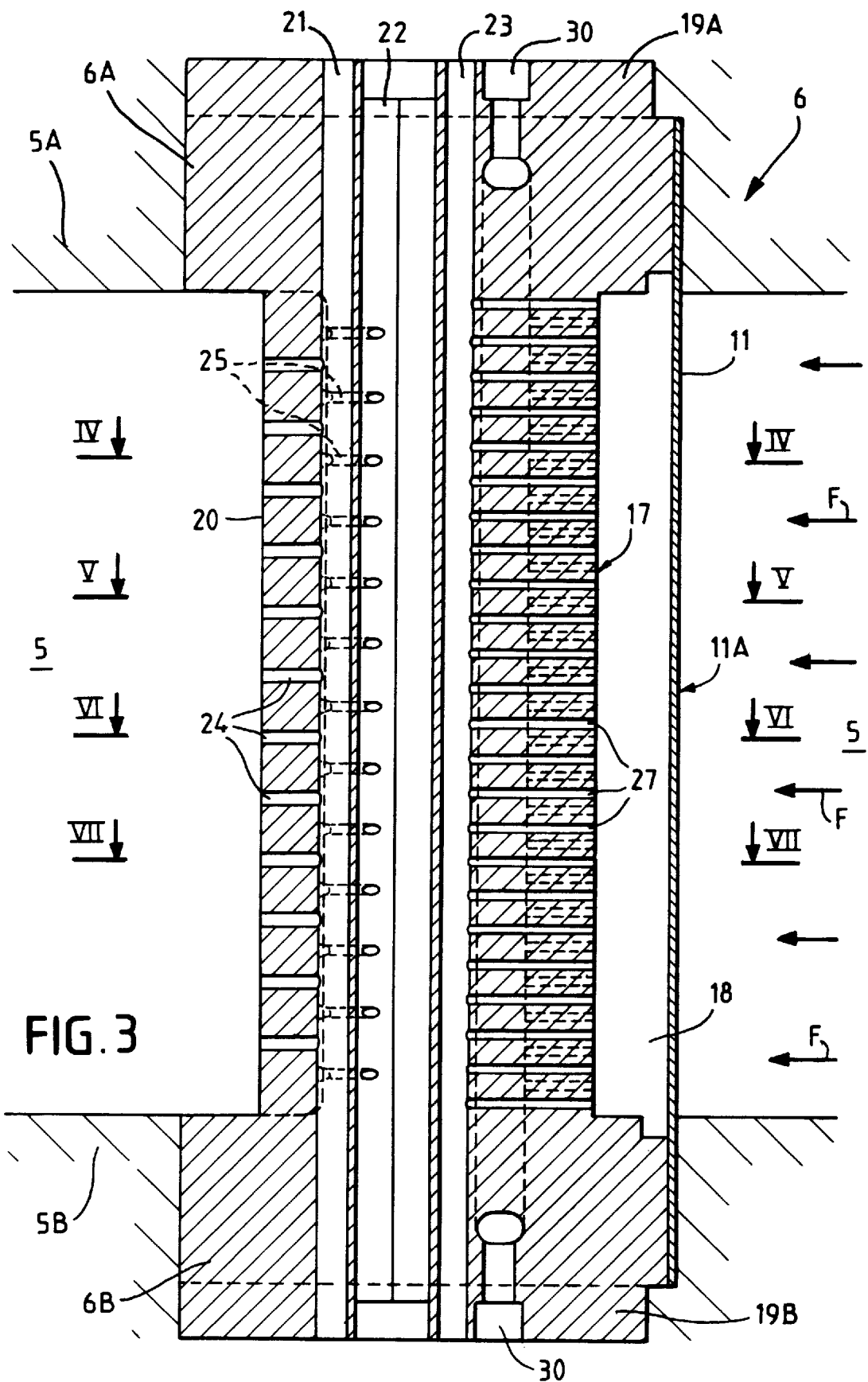
FIG. 3 is a central longitudinal section of the stub, joined together, in the FIG. 2, on the line III—III in the latter.
Figure 6:
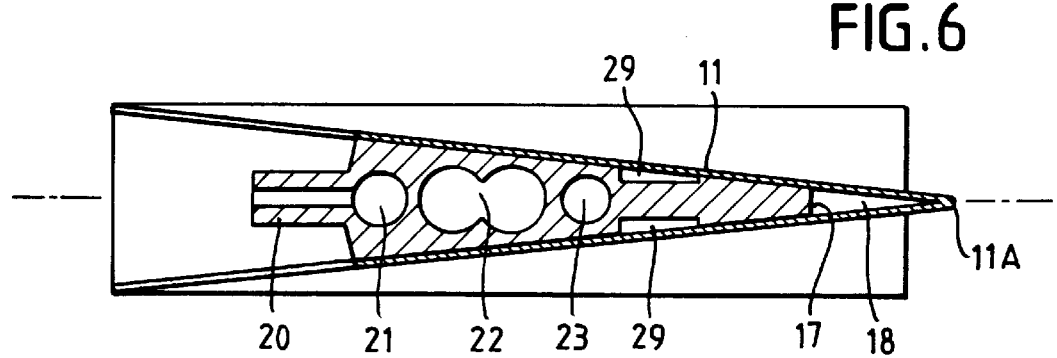

The longitudinal channel 21 communicates with a number of transverse channels 24 which are made in the rib 20 and distributed along the central part 10M of the body 10 (see FIGS. 3 and 6).

Figure 4:
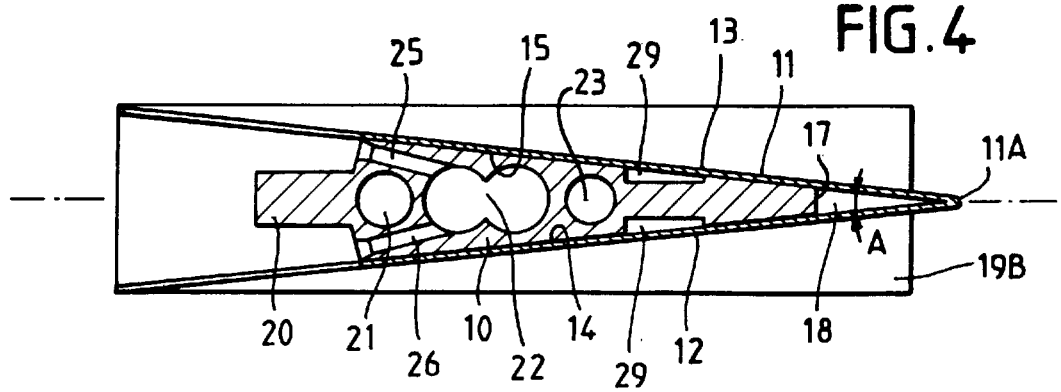
FIGS. 4, 5, 6 and 7 are cross sections of said fuel injection stub, corresponding respectively to the lines of section IV—IV, V—V, VI—VI and VII—VII in FIG. 3.
Figure 5:
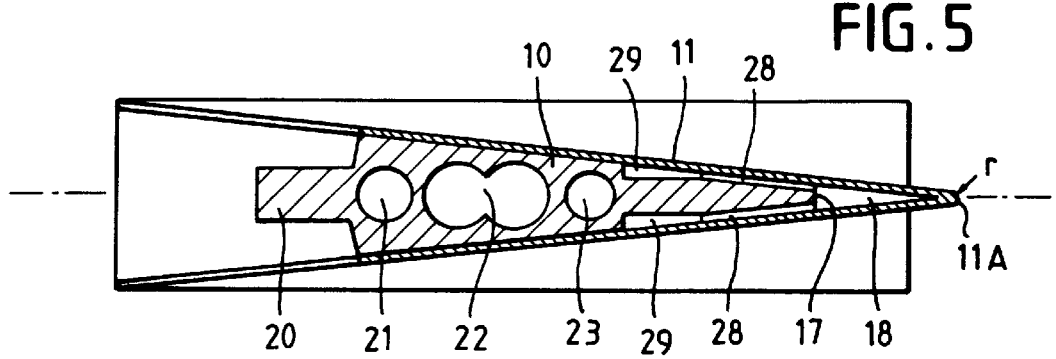

The longitudinal channel 22 communicates with a number of transverse channels 25 and 26 which emerge on each side of the longitudinal rib 20 (see FIGS. 3 and 4).

Figure 7:
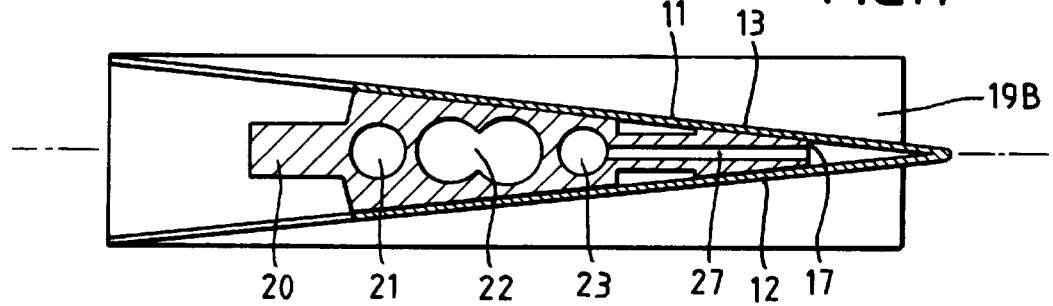

The longitudinal channel 23 communicates with a number of transverse channels 27 which emerge in the facet 17 and therefore in the sealed chamber 18 (see FIGS. 3 and 7).

Moreover, the walls 14 and 15 of the central part 10M of the body 10 include a number of transverse surface grooves 28 which connect said facet 17 to surface longitudinal grooves 29 which themselves are connected at their ends to longitudinal channels 30 emerging at the end of the heads 6A and 6B. The surface grooves 28 and 29 are closed off by the nose piece 11 (see FIGS. 3 and 5).

It will be readily understood that, when fuel is injected into the channels 21 and 22 it is also injected into the chamber 5, in the direction of the combustion chamber 8, respectively by the transverse channels 24 and 25 which each behave as an elementary injector. Likewise, when a coolant is injected into the longitudinal channel 23, this coolant is injected into the sealed chamber 18 via the transverse channels 27. The coolant injected into the chamber 18 is recovered via the transverse grooves 28 and runs via these into the longitudinal grooves 29. It can therefore be evacuated via the channels 30.

Of course, although in FIG. 3 the channels 21, 22, 23 and 30 have been shown open at their two ends, it is possible to close off one or other of said ends.

According to an important feature of the present invention, the coolant, for example low-temperature hydrogen, is at a pressure (for example of about 10 bar) such that the jets of coolant coming out of the channels 27 pass through the sealed chamber 18 and strike the internal surface of the faces 12 and 13 of the nose piece 11, at least near the edge 11A. As stated above, the coolant flow rate must, of course, be sufficient for the temperature of the nose piece 11 to remain between 1000° C. and 2000° C. under flight conditions at a high Mach number. In the case in which the coolant is hydrogen, such a flow rate must be several grams per second and per cm of length of leading edge 11A.

Such a coolant may be the fuel used to feed the combustion chamber 8. In this case, the coolant feeding the injection means 23, 27 is taken off from the circuit feeding the injection rail 21, 22, 24, 25 and 26. Preferably, the flow rate of fuel used as coolant is less than 20% of the total flow rate of fuel injected into the combustion chamber 8.

Figure 8:
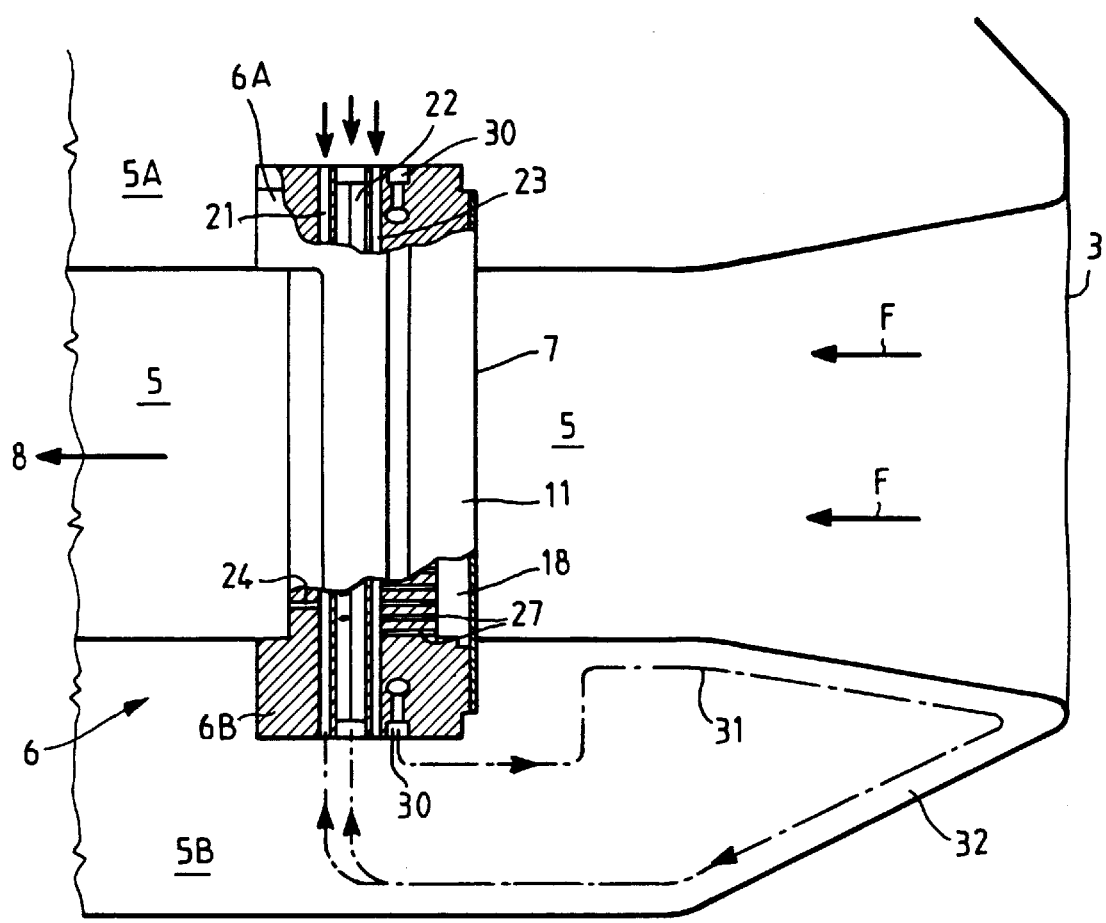
FIG. 8 diagrammatically illustrates an example of the recovery and reinjection of the coolant.

Of course, it is advantageous for the means 28, 29, 30 which remove the fuel used as coolant, after impact against the nose piece 11, to cover said fuel and reinject it into the combustion chamber 8. FIG. 8 diagrammatically illustrates an example of such recovery. In this example, the fuel, recovered from the sealed chamber 18, is reinjected into the combustion chamber 8, via the rail 21, 22, 24, 25 and 26, after it has followed a cooling path 31 enabling part of the ramjet 1, for example the shroud 32 of the air intake 3, to be cooled.

We claim:

1. A fuel injection stub (6) for a ramjet (1) which is designed to operate at a high Mach number and which includes a combustion chamber (8) into which an oxidizer flow (F) is introduced, said stub (6) including a nose (7) receiving said oxidizer flow and forming a rail of elementary fuel injectors (24, 25, 26), said rail being arranged in said oxidizer flow transversely to the latter and distributing said fuel in said oxidizer flow, wherein:
    said nose (7) is formed, at least near its leading edge, by a thermally conductive thin wall (11) having at least approximately the shape of a dihedron, the angle (A) of said dihedron being at most equal to 15° and the radius (r) of the leading edge (11A) of said nose being at most equal to 2 mm; and
    said stub including:
        a sealed chamber (18) arranged in the concavity of said thin wall (11) of the nose;
        means (23, 27) for injecting a coolant into said sealed chamber (18), said injection means producing a number of jets of pressurized coolant which are distributed along said nose and strike the concave face of said thin wall, at least in the region of said leading edge (11A); and
        means (28, 29, 30) for removing said coolant after impact of said jets against the concave face of said thin wall (11).

2. The injection stub as claimed in claim 1, wherein the thickness (e) of said thin wall (11) of the nose is at most equal to 2 mm.

3. The injection stub as claimed in claim 1, wherein the conductivity of the constituent material of said thin wall (11) of the nose is about 70 W/(m.K).

4. The injection stub as claimed in claim 1, wherein the coolant is a low-temperature gas.

5. Injection stub as claimed in claim 1, for an aircraft having to fly at Mach 12, the nose of said stub having to withstand a temperature close to 1500° C., wherein:
    the thin wall (11) of the nose has a dihedral angle (A) of 12° and a leading-edge radius (r) equal to 1.5 mm;
    the thin wall of the nose has a thickness (e) of about 1 mm and its constituent material has a conductivity of about 70 W/(m.K);
    the coolant is hydrogen at a temperature of 100 K to 300 K and at a pressure of about 10 to 15 bar; and
    the flow rate of the coolant is about 2 to 5 gls for each cm of length of said leading edge.

6. The injection stub as claimed in claim 1, wherein the coolant consists of fuel.

7. The injection stub as claimed in claim 6, wherein the flow rate of fuel used as coolant is less than 20% of the total flow rate of fuel injected into the combustion chamber (8) of the ramjet.

8. The injection stub as claimed in claim 6, wherein said evacuation means (28, 29, 30) recover the coolant after impact against the concave face of the thin wall (11) of the nose and reinject it into the combustion chamber (8) of the ramjet.

9. The injection stub as claimed in claim 1, which includes:
    a body (10) in which said rail of elementary fuel injectors (24, 25, 26), said coolant injection means (23, 27) and said means (28, 29, 30) for removing said coolant are arranged; and
    a nose piece (11) having at least approximately the shape of a dihedron with thin faces (12, 13) constituting said thin wall;
    wherein said nose piece (11) is joined to said body, in a sealed manner, by said thin faces; and
    wherein, in the position in which said nose piece (11) is joined to said body (10), said sealed chamber (18) is formed in the concavity of said nose piece, between the latter and said body.

10. The injection stub as claimed in claim 9, wherein, at least on the side where said nose is located, said body (10) has a cross section with the shape of a wedge, the angle of which is equal to that of said nose piece (11), so that said thin faces (12, 13) of the nose piece are pressed against the faces (14, 15) of said wedge and wherein the edge (16) of said wedge is cut over at least part of its length in order to form at least one end facet (17) in which injection nozzles (27) are arranged, said injection nozzles forming part of said coolant injection means and producing said jets of said coolant striking the concave face of said thin wall (11).

11. The injection stub as claimed in claim 9, wherein said means for removing the coolant include:
- at least one longitudinal groove (29) made on the surface of said body (10) and closed off by one face of said nose piece (11); and
- an array of transverse surface grooves (28) bringing said sealed chamber (18) into communication with said longitudinal groove (29) and also closed off by said nose piece.

12. The injection stub as claimed in claim 9, wherein said fuel injection rail and said coolant injection means include longitudinal feed channels (21, 22, 23) and transverse injection channels (24 to 27), all these being made in said body of the stub.

13. The injection stub as claimed in claim 1, wherein said fuel injection rail is arranged on that side of said stub which is opposite said nose.

14. The injection stub as claimed in claim 13, wherein said fuel injection rail includes series of separate elementary injectors, some of them (injectors 24) injecting fuel in the direction of the oxidizer flow and the others (injectors 25 and 26) injecting fuel obliquely into said flow.

15. The injection stub as claimed in claim 9, wherein the body (10) of said stub includes, on the side opposite said nose, a projecting central longitudinal base rib (20), wherein at least one series of elementary injectors (24) injecting fuel in the direction of the oxidizer flow is arranged in said base rib and wherein at least two series of elementary injectors (25, 26) injecting fuel obliquely into said flow are arranged on each side of said base rib.

16. The injection stub as claimed in claim 9, wherein said body (10) of the injection stub includes, at its ends, heads (6A, 6B) which are designed to anchor the stub in opposite walls (5A, 5B) of said ramjet and to feed said stub with fuel and coolant and wherein said nose piece (11) covers at least part of said heads.

* * * * *